United States Patent [19]

Kim et al.

[11] Patent Number: 4,809,278

[45] Date of Patent: * Feb. 28, 1989

[54] SPECIALIZED PARITY DETECTION SYSTEM FOR WIDE MEMORY STRUCTURE

[75] Inventors: Dongsung R. Kim, Laguna Hills; Reinhard K. Kronies, Fountain Valley, both of Calif.

[73] Assignee: Unisys Corporation, Blue Bell, Pa.

[*] Notice: The portion of the term of this patent subsequent to Dec. 1, 2004 has been disclaimed.

[21] Appl. No.: 854,232

[22] Filed: Apr. 21, 1986

[51] Int. Cl.[4] ............................................. G06F 11/10
[52] U.S. Cl. ..................................................... 371/51
[58] Field of Search ...................... 371/49, 51; 365/201

[56] References Cited

U.S. PATENT DOCUMENTS

| | | | |
|---|---|---|---|
| 3,789,204 | 1/1974 | Barlow | 371/51 |
| 3,944,800 | 3/1976 | Beck et al. | 371/51 |
| 4,016,409 | 4/1977 | Kim | 371/51 |
| 4,019,033 | 4/1977 | Parmet | 371/51 |
| 4,271,521 | 6/1981 | Mahmood | 371/51 |
| 4,295,219 | 10/1981 | Draper et al. | 371/51 |
| 4,355,393 | 10/1982 | Kubo et al. | 371/51 |
| 4,453,251 | 6/1984 | Osman | 371/51 |
| 4,464,755 | 8/1984 | Stewart et al. | 371/51 |
| 4,612,640 | 9/1986 | Mehrotra et al. | 371/51 |

OTHER PUBLICATIONS

Sellers et al., Error Detecting Logic for Digital Computers, McGraw-Hill, N.Y., 1968, pp. 207-211.

Primary Examiner—Charles E. Atkinson
Attorney, Agent, or Firm—Alfred W. Kozak; Nathan Cass; Kenneth L. Miller

[57] ABSTRACT

A parity detection scheme for a wide memory structure of RAM memory chips provides an auxiliary RAM parity memory chip to store parity data for each corresponding input line of each memory chip corresponding for each address of each memory chip. This parity data is compared to comparable parity data which is read-out of any corresponding address of each of said memory chips.

7 Claims, 3 Drawing Sheets

SPECIALIZED PARITY DETECTION SYSTEM FOR WIDE MEMORY STRUCTURE

FIELD OF THE INVENTION

This disclosure relates to circuitry and systems for proving out data transfer integrity when data bits are placed in a wide memory structure which can be verified by use of specialized parity check circuitry.

CROSS REFERENCES TO RELATED APPLICATIONS

This disclosure is related to other patent applications involving similar subject matter as follows:

U.S. Ser. No. 848,073, filed Apr. 4, 1986 by inventors Dongsung R. Kim and Reinhard K. Kronies, entitled "Parity Detection System for Wide Bus Circuitry", which issued as U.S. Pat. No. 4,710,935 on Dec. 1, 1987.

U.S. Ser. No. 904,443, filed Sept. 8, 1986 by inventors Dongsung R. Kim and Reinhard K. Kronies, and entitled "Enhanced Parity Detection for Wide ROM/PROM Memory Structure".

BACKGROUND OF THE INVENTION

Many types of memory chip structures are used in the course of digital circuitry, the simplest memory structure of which is when the memory chips are merely one bit wide. For example, a memory with organization such as a 4K by 1 represents the situation where the memory structure is one bit wide and the memory unit can store 4,092 bits of memory and each individual bit-space can be addressed in order to output the particular data bit which resides in that memory space.

The conventional parity check detection circuitry which is used for such a memory structure (which is made up by one bit wide memory chips) is provided by adding a single parity bit to each word wherein the parity bit is stored into the memory together with the written-in word during the Write time. Subsequently, when the particular word and its parity bit is read out, then a new parity check is accomplished by checking the parity for the particular word that was read out during the Read time.

This scheme works adequately as long as the memory chips used are merely one bit wide in their organization since, in this case, any single chip failure would result in a single bit failure and thus be detected by the Read-out of the word and its parity bit.

However, increasingly today, the memory chips used in memory structure are organized according to multi-bit widths, such as 1K by 4. Under these conditions the normal detection scheme of adding a parity bit to the writing of a wide word and then detecting the parity bit after the reading out of the word would cause the system to miss many single chip failures since this can result in no failure to a 4 bit failure.

Since the memory structures used very often consist of multi-bit width memory chips, as for example, in such designs as control stores and look-up tables, it is most desirable to have a more accurate parity detection scheme to overcome the inaccuracies inherent in the prior types of parity checking.

For ease of explanation, the memory chip used in this example is a 1K×4 organization. However, the usable principle applies to any wide data bit memory organization.

SUMMARY OF THE INVENTION

The present disclosure is an improved and more accurate parity detection scheme which is applicable to multi-width memory structures. This system generates a set of parity data for each word placed in an addressed location by generating a set of parity bits which is equal to the number of input lines (k) to each of the multi-bit width memory chips which are used in the memory structure.

Thus, the parity bit designated "P0" (FIG. 1) would be the parity sum of the bit "0" of each corresponding input line of each of "q" memory chips. Similarly, the parity bit "Pk" would be the parity sum of all the bit "kn's" of each one of the memory chips. These parity bits are established by tapping each set of k input bit lines on each memory chip which carry data for writing into a memory structure such as a RAM memory 20.

Then after the particular RAM memory is enabled for read-out, each co-relating set of output bit lines of each memory chip are parity summed for comparison with the output of a RAM parity memory chip which correlates the data from the Write cycle bit lines with the data on the Read cycle bit lines at any given address.

A first and second set of exclusive OR gates (XOR) is used to generate first and second sets of "k" resultant parity data for each respective Write-Read cycle that addresses the same memory location.

An auxiliary parity memory chip receives the first set of k resultant parity data for storage in locations which correspond to similar locations in each memory chip so that the same address data will read out the first set of resultant parity data corresponding to each address in the structured memory. This parity data is then input to said second set of exclusive OR gates to provide said second set of "k" resultant parity data.

The outputs of the second set of exclusive OR gates are fed to a single OR gate which will output a parity error signal should any inconsistencies occur in parity data.

Thus, any single chip failure which can result in one to four bit errors will be detected by this scheme.

DESCRIPTION OF A PREFERRED EMBODIMENT

Figure 1A:
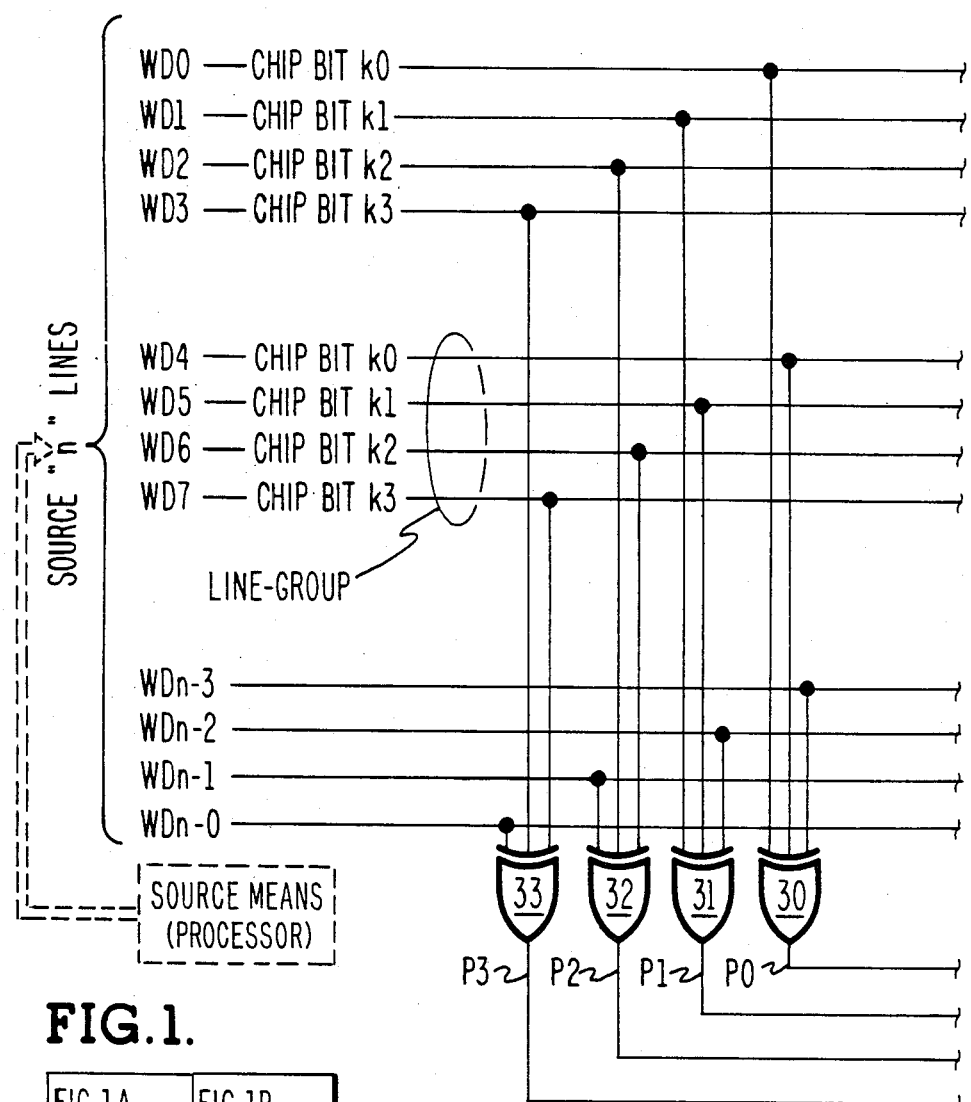
FIGS. 1A and 1B, is a schematic drawing showing a multi-bit memory structure using, for example, 4-bit wide RAM memory chips which are paralleled to connect a source means of data bits into a memory storage system after which they can be read out on the opposite destination side of the memory structure.
Figure 1:
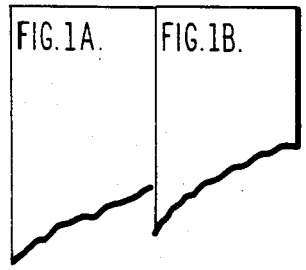
FIG. 1, comprising
Figure 1B:
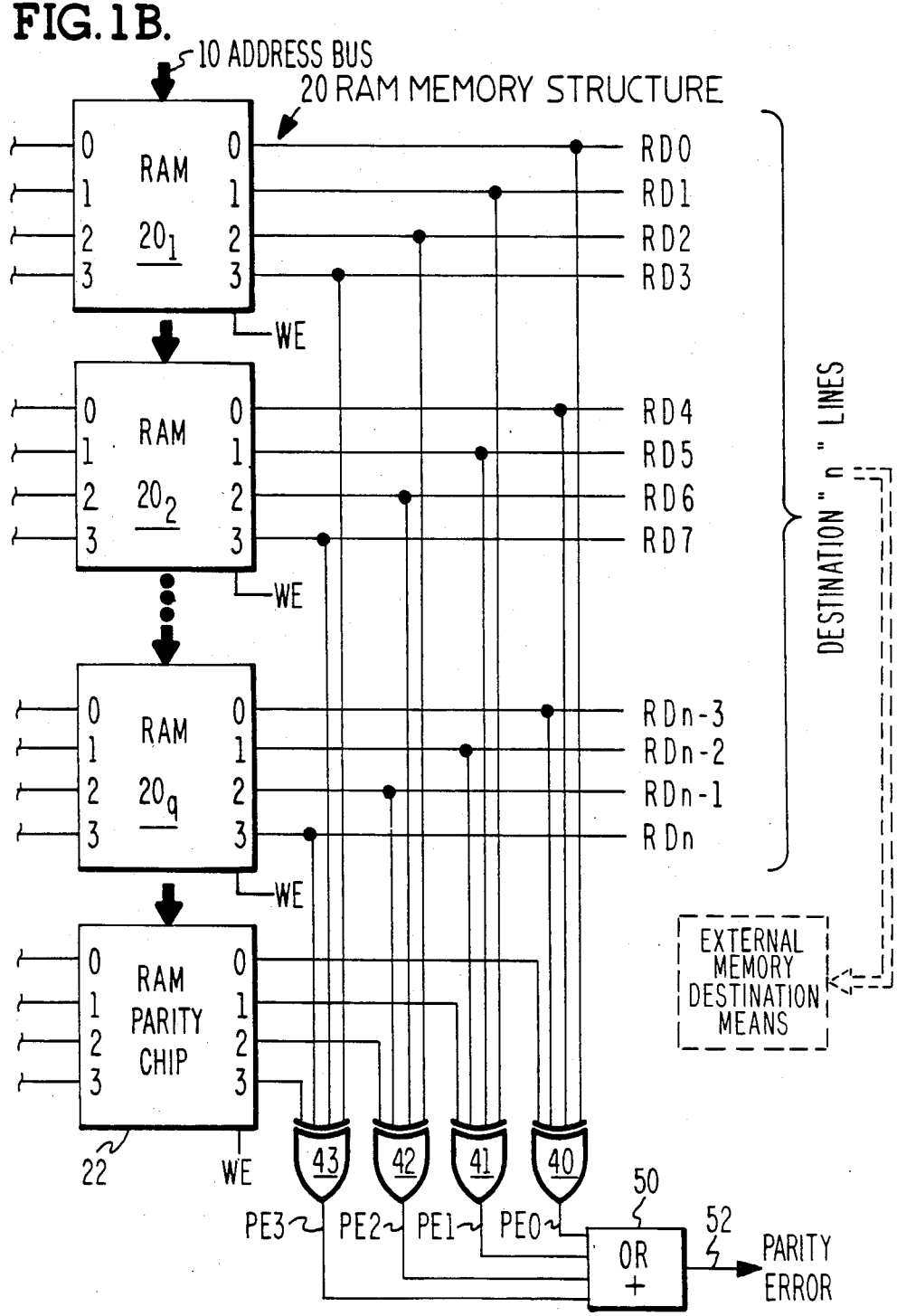

As seen in FIG. 1, a typical multi-bit wide memory structure is shown wherein a series of units shown as multiple width RAM chips, $20_1$, $20_2$—$20_q$ are shown to provide a structured memory storage unit 20 which is fed by a bus from a source means along a number (n) of data bit lines.

Each memory chip address may be "m" bits for $2^m$ locations, and each line-group of 4 bit lines of the memory data bus is fed into the four data inputs to the RAM memory chip. These inputs, as shown in FIG. 1, are designated as chip bit $k_0$, $k_1$, $k_2$, and $k_3$. The inputs to RAM $20_q$ would be designated as $k_{q0}$, $k_{q1}$, $k_{q2}$, and $k_{q3}$.

As seen in FIG. 1, the RAM memory structure is provided with an address bus 10 which is used to select which specific locations in the individual memory chips will be used for data to be temporarily stored. Additionally, each RAM memory chip has a Write enable (WE) line which selects whether the memory can be written into or can be read-out from.

Thus, the series of "n" memory data bus lines carrying data bits (FIG. 1) are shown at the left as coming from a source and then being input into addressed locations in a series of memory chip units after which they can be read out and placed on the memory bus of "n" lines for transfer to a destination. The source means, for example, may be a processor which has an output data bus of "n" lines. Likewise, the destination means may, for example, consist of an external memory unit which receives data on the bus having "n" bit-lines.

As will be seen in FIG. 1, each memory chip has an input set of "four" lines, which number of inputs may be designated as "k" since the memory chip may have more or less than the 4 lines shown. Thus, the letter "k" will designate the number of data bit lines such that each particular memory chip is characterized as having k input lines and k output lines.

It will be noted that each bit $k_0$ of each of the memory chips is connected to an exclusive OR gate 30. Likewise, each $k_1$ bit line of the RAM memory chips is connected to an exclusive OR gate 31. Likewise, bit $k_2$ for each of the memory chip inputs is connected to an exclusive OR gate 32 and each input bit $k_3$ of each of the memory chips is connected to the exclusive OR gate 33.

Each of the exclusive OR gates 30 through 33 will provide a particular parity output signal designated as $P_0$, $P_1$, $P_2$ and $P_3$. These may be designated as a first set of resultant parity data. These outputs are fed to the RAM parity memory chip 22 in a fashion which correlates the input bit k with the corresponding input bit k of each of the series of RAM memory chips.

On the output side of the RAM memory chips $20_1$ through $20_q$, there is the Read-out side of the memory bus. In a similar fashion to the input or Write-in side, the Read-out side of the memory bus provides connections which connect each corresponding k bit line of each memory chip to a particular exclusive OR gate. Thus, the exclusive OR gate 40 connects all the $k_0$ lines; the exclusive OR gate 41 connects all the $k_1$ bit lines; the exclusive OR gate 42 connects each of the $k_2$ bit lines; while the exclusive OR gate 43 connects each of the bit lines $k_3$.

Additionally, it will be seen that the co-relating "k" outputs of the auxiliary RAM parity memory chip 22 also connect the correspondng bit lines to exclusive OR gates 40, 41, 42 and 43.

The second set of exclusive OR gates have respective resultant parity data lines designated $PE_0$, $PE_1$, $PE_2$ and $PE_3$. These series of output lines are fed to an OR gate 50, whereby any inconsistency between the outputs of the corresponding parity chip bit lines of RAM parity chip 22 and the corresponding parity sum of k output lines of each memory chip will cause a resultant parity error signal to occur at the moment of inconsistency.

As will be noted from the connections shown in FIG. 1, the RAM parity memory chip 22 has a series of address locations which correspond to the same set of address locations in the RAM memory chips $20_1$, $20_2$—$20_q$.

Thus, for each set of input data on the source lines which are placed in a particular address in the wide memory structure of the memory system, there will also be written-in a set of corresponding bits $P_0$, $P_1$, $P_2$ and $P_3$ which will be placed in the corresponding address location inside the RAM parity memory chip 22.

Thereafter, on the Read operation, when a specific memory area is addressed in order to place data bits on the destination side of the memory structure, it will be seen that the same particular memory area is addressed on the RAM parity memory chip in order to provide an output of parity bits which correspond to that particular address. These then can be transmitted to each of the exclusive OR gates 40, 41, 42 and 43 for comparison with the other inputs to each of these gates in order to see whether parity consistency has been maintained or there is a parity error.

If there is an inconsistency in any one of the inputs to gates 40 through 43, then the parity error signal $PE_0$, $PE_1$, $PE_2$ or $PE_3$ will indicate this parity error such that any difference in the states of the parity error output lines will be revealed by the OR gate 50 in order to provide a parity error signal on line 52.

Thus, it can be seen that if a memory structure is made of memory chips that are k bits wide and the number of data bit lines in the bus is "n" lines, then it will be seen that if "n" is divided by "k", the number of memory chips required can be given the value of "q".

Thus, "q" equals "n" divided by "k" ($q=n/k$).

The particular parity detection scheme involved provides that even though multi-width memory structures are used, there will be no loss of accuracy in parity detection should an entire memory chip fail or should one portion of a memory chip fail.

In any case, any type of failure in the memory chip will be detected by the parity detection system, since each bit line of data on the input or "Write" side is checked to provide a parity bit to the RAM parity chip which can then be checked with its corresponding bit line data on the "Read" or output side of the memory structure in order to provide a parity error output signal which can be used to flag a suitable processor unit in order to reschedule or retry the data transmission.

There has been described herein a specialized parity detection scheme for a wide memory structure which overcomes the difficulties which are presented when using the standard parity type detection scheme wherein each word of memory is provided with a parity bit which is then read out of memory with its parity bit and checked to see whether the read-out parity checks with the written-in parity bit to overcome the limitations whereby the old standard-type parity detection scheme, which system could not be completely accurate in its detection of misduplication or lost bits in the course of writing into and reading out of a memory structure.

While certain variations of the above described concepts may be made in structure, it should be understood that the disclosed invention is to be defined and encompassed by the following claims:

What is claimed is:

1. A parity checking system for checking reliability of data transfers of data stored in and read out of a wide random access memory structure where a data transfer bus has "n" data bit lines organized in line-groups of "k" lines and each group of "k" lines is serviced by a single multiple width memory chip, the combination comprising:

(a) said data transfer bus having "n" data bit lines for transferring data from a source means to a destination means and including:

(a1) a series of "q" line-groups wherein each line-group is composed of "k" consecutive bit lines;

(b) a plurality of "q" multiple width RAM memory chips forming said wide memory structure, and connected to receive and store data bits from said source means, where "q" =n/k and wherein "k" represents the number of data bit lines in said line-group connected to each memory chip, where "k" is also a submultiple of "n", and each of said plurality of "q" memory chips being connected to receive a consecutive series of "k" data bit lines from each of said line-groups of said transfer bus for subsequent readout on corresponding data bit output lines for transfer to a destination means, and wherein each of said memory chips has "k" data bit input lines for receiving data bits for storage in each particularly addressed memory location, and each consecutive data bit input line to each memory chip is designated as $k_0, k_1, k_2$—$k_x$ so that each of said memory chips has an input data bit line which corresponds to a co-related input data bit line on each other of said memory chips;

(c) first sense means, connected to said source means, for sensing each of said data bits on each said corresponding input line on each of said "q" memory chips to provide a first set of "k" resultant parity bits for temporary storage in an auxiliary RAM parity chip;

(d) second sense means, connected to said destination means, for sensing each of said data bits on each said corresponding output bit line of each of said "q" memory chips to constitute a second set of "k" resultant bits as input to said second sense means, said second sense means including:

(d1) checking means for comparing said first set of "k" resultant parity bits and said second set of "k" resultant bits for providing a third set of "k" output lines to a thrid sense means;

(e) an auxiliary RAM parity memory chip which duplicates the width and address location of each of said plurality of memory chips and is operated as a parity storage chip on each write-read cycle for temporary storage of said first set of "k" resultant parity bits which are representative of input data to each address location of said wide memory structure, said RAM parity memory chip having "k" input lines for receivng said first set of "k" resultant parity bits from said first sense means;

(f) third sense means for receiving said third set of "k" output lines to determine coincidence or non-coincidence of said first set of "k" resultant parity bits and said second set of "k" resultant bits;

(g) said source means for generating a multiple number "k" of data bits, each bit on one of "k" bit lines, for writing into said wide memory structure;

(h) said destination means for receiving "k" data bits read out of said wide memory structure on "k" output bit lines.

2. The combination of claim 1 wherein said first sense means includes:

(a) a first set of "k" exclusive OR gates (XOR) each one of said XOR gates connected to receive one data bit from each of said "q" line groups, said one data bit for each XOR coming from a different one of the said "k" lines of said line group;

(b) a first set of "k" resultant parity output bits for transfer to an auxiliary RAM parity chip during write-in of data into said wide memory.

3. The combination of claim 2 wherein said second sense means includes:

(a) a second set of "k" exclusive OR gates (XOR) wherein each of said XOR gates has a series of "k" gate inputs whereby each of said gate inputs is connected to the same corresponding one of said data bit output lines from each of said "q" memory chips;

(a1) and wherein each one of said second set of XOR gates has an additional input from a corresponding output line of said auxiliary RAM parity memory chip, and (b) a set of "k" output lines, designated as said second set of resultant parity bits, providing one line output from each one of said second set of XOR gates.

4. The combination of claim 1 wherein said checking means includes:

(a) an auxiliary output OR gate (OR) for receiving the outputs of each of said second set of XOR gates to establish an error signal when parity error occurs.

5. A parity checking system for data transferred into and out of a wide RAM memory structure, comprising in combination:

(a) a wide memory bus structure having "q" RAM memory chips operating in parallel, each of said memory chips having a width of "m" bits wherein each of said RAM memory chips receive "k" input bit-lines and include "k" corresponding output bit lines;

(b) addressing means for addressing corresponding locations in each of said plurality of memory chips;

(c) enabling means for enabling the write-in or the read-out of data bits to/from each addressed location in each of said plurality of memory chips;

(d) a series of "q" line-groups wherein each line-group consists of "k" data bit lines for input to each of said memory chips;

(e) parity data sensing means for sampling data bits written into said memory structure for comparison with the data bits read out of said memory structure for each address location in order to determine whether a parity error has occurred, thus indicating faulty data transfer, said parity data sensing means including:

(e1) a first set of "k" XOR gates wherein each one of said XOR gates samples the corresponding input bit line to each of said memory chips and uses an exclusive OR gate operation to provide a first set of output parity bits for each one of said "k" input lines;

(e2) a RAM parity memory chip connected to receive each of said first set of "k" parity output bits from said XOR gates and to provide an address location for each corresponding addressed location in said wide memory structure for storage of said first set of "k" parity output bits;

(e3) a second set of "k" exclusive OR gates (XOR) wherein each of said gates samples each corresponding one of said output bit lines of each said memory chip in said wide memory structure and additionally samples the corresponding set of output parity data bits from said RAM parity memory chip in order to generate a set of "k" parity error signals which relate to each said bit line of each said memory chip.

6. The combination of claim 5 which includes:

(a) an auxiliary OR gating means for receiving each of the said "k" parity error signals from said second set of XOR gates to generate a parity error signal should there be a non-coincidence of parity data.

7. In a wide structured memory having "q" units of parallel RAM memory chips wherein each memory chip has "m" bits of address lines and has "k" input data lines and "k" output data lines wherein each successive input and output line for each said RAM memory chip is designated as $k_0$, $k_1$, $k_2$—$k_q$ and has "b $2^m$" locations for storage of "k" bits in each location, whereby each one of said "$2^m$" locations can be addressed for write-in of data or read-out of data, a parity checking sytsem comprising in combination:
  (a) first means for sampling each one of said "k" corresponding input data lines of each one of said memory chips at the moment of address occurrence for the selection of a memory location during write-in to each of said memory chips to generate a first set of "k" parity data outputs ($P_0$, $P_1$, $P_2$—$P_q$);
  (b) second means for sampling each one of said "k" corresponding output data lines of each one of said "q" memory chips for comparison wtih each one of said first set of "k" parity data outputs at the moment of address occurrence during read-out, for the selection of the same memory locations as was addressed during write-in, in order to generate a second set of "k" parity data outputs ($PE_0$, $PE_1$, $PE_2$—$PE_q$);
  (c) an auxiliary parity memory chip having "k" inputs from said first set of "k" parity data outputs and having a set of addressable memory locations storing parity data bits corresponding to each addressable location in each of said "q" memory chips, said parity memory chip providing a first set of k parity bits on "k" parity output lines to carry out said stored parity data bits from any addressed location corresponding to the addressed location in each of said memory chips;
  (d) auxiliary output gate means for receiving said second set of "k" parity data outputs to sense the occurrence of a parity error.

* * * * *